3,475,499
PREPARATION OF GLYCOLS AND GLYCOL ETHERS

Charles N. Winnick, Teaneck, N.J., assignor to Halcon International, Inc., a corporation of Delaware
No Drawing. Continuation-in-part of application Ser. No. 409,961, Nov. 9, 1964. This application Mar. 23, 1967, Ser. No. 625,288
Int. Cl. C07c 43/04, 31/20
U.S. Cl. 260—615   4 Claims

ABSTRACT OF THE DISCLOSURE

A mixture of normal alpha olefins is epoxidized by reaction with an organic hydroperoxide in the presence of a catalyst. The resulting 1,2-epoxides are reacted with water or ethylene glycol to form the corresponding glycols or glycol ethers.

RELATED APPLICATION

The present application is a continuation-in-part of copending patent application, Ser. No. 409,961, filed Nov. 9, 1964 and now abandoned.

BACKGROUND OF THE INVENTION

This invention is concerned with the preparation of glycols and glycol ethers, with the separation of these materials from hydrocarbons, and especially with a process for the preparation of compounds suitable for use as biodegradable detergents and more specifically is concerned with a process for the preparation of compounds which when reacted with ethylene oxide will form derivatives suitable for nonionic and anionic detergent production.

It is known in the art that normal primary alcohols wherein the number of carbon atoms is generally from 8 to 24 when reacted with ethylene oxide, will form non-ionic, bio-degradable detergents. The preparation of normal primary alcohols, however, is not altogether free from difficulty. Two methods known to the art include hydroformylation (oxo reaction) and ethylene polymerization (Ziegler process) followed by oxidation.

Another method which is of value in certain applications involves the steps of epoxidation of a normal alpha-olefin fraction to form a mixture of higher 1:2 epoxides and hydrogenation of the higher 1:2 epoxides to form the primary alcohols. However, where conversion of the alpa-olefins in the epoxidation step is not substantially complete it is necessary to separate the higher 1:2 epoxides from residual alpha-olefins prior to hydrogenation in order to avoid hydrogenation and loss of residual alpha-olefins to the corresponding paraffins. Since the epoxide formed from a normal alpha olefin has a vapor pressure close to that of the homologous normal alpha-olefin containing 2 more carbon atoms, if a feed fraction containing a range of alpha-olefins is used it naturally becomes quite difficult to effect a separation of the feed and product.

It is an object of this invention to provide a process for the preparation of hydroxyl compounds from mixtures of the higher 1:2 epoxides and unreacted alpha-olefins which will be suitable starting materials in the production of biodegradable detergents.

It is a further object of this invention to carry out the preparation of these hydroxyl compounds in the epoxidation reaction mixture without the necessity of first separating the 1:2 epoxides from that mixture.

It is a still further object of this invention to produce hydroxyl compounds which are easily separated from the mixture of unreacted alpha-olefins.

An additional object is the preparation of biodegradable detergents.

Other objects will be apparent from the following description of the invention.

BRIEF SUMMARY OF THE INVENTION

In accordance with the invention a mixture of normal alpha olefins is epoxidized to a mixture of the corresponding 1:2 oxides by reaction with an organic hydroperoxide in the presence of a catalyst. Temperatures broadly in the range of from about 20° C. to about 200° C. and preferably from about 50° C. to about 120° C. are employed and the pressure should be sufficient to keep the reaction in the liquid phase. Illustrative pressures are 0 to 500 p.s.i.g.

After epoxidation of the normal alpha-olefins, the product mixture containing 1:2 oxides is reacted with either water or ethylene glycol, preferably the former, to form the corresponding glycols or glycol ethers. This procedure has outstanding, dual advantages in that the glycols and glycol ethers are themselves exceedingly useful intermediates in biodegradable detergent production, and also that, whereas the separation of the 1:2 oxides from unreacted olefins is very difficult, the glycols and glycol ethers are very readily separable from unreacted olefins.

DETAILED DESCRIPTION

The normal alpha olefins used in the present invention contain from about 3 to about 30 carbon atoms. The mixture of these normal alpha olefins comprises at least 2 of such olefins.

The organic hydroperoxides which may be employed in the epoxidation step are those having the formula ROOH wherein R is a substituted or unsubstituted alkyl, cyclo-alkyl, or aralkyl radical, preferably having about 3 to 20 carbon atoms. As examples of such hydroperoxides there may be mentioned t-butyl hydroperoxide, cyclohexane hydroperoxide, methylcyclohexane hydroperoxide, cumene hydroperoxide, ethyl benzene hydroperoxide, tetrahydronaphthalene hydroperoxide, diisopropylbenzene hydroperoxide, isopentane hydroperoxide, diethyl benzene hydroperoxide, cyclohexylbenzene hydroperoxide, 1,1-diphenylethane hydroperoxide, fluorene hydroperoxide, tetrahydrofuran hydroperoxide. The foregoing hydroperoxides may be substituted by such groups as, for example, halogen, nitro, alkoxy, nitrile or acyloxy.

The catalysts include compounds of the following: Ti, V, Cr, Cb, Se, Zr, Mo, Te, Ta, W, Re, U. These may be characterized as forming peracids or as hydroxylation catalysts. By far, the preferred catalysts are compounds of V, Mo, W or Se. Mixtures may be used.

Catalyst concentration in the epoxidation may be varied widely but it is desirable to use at least 0.00001 mol and preferably 0.002 to 0.03 mol of metal per mol of hydroperoxide. Catalytic components may be employed in the epoxidation reaction in the form of a compound or mixture which is initially soluble in the reaction medium. A suitable substance contemplated by the invention includes hydrocarbon soluble, organo-metallic compounds having a solubility in methanol at room temperature of at least 0.1 gram per liter.

The molybdenum compounds that are suitable include in addition to the organic salts, the oxides, such as $MoO_3$ and $MoO_2$, molybdic acid, the chlorides, oxychlorides, fluorides, sulfides and the like. Hetero-polyacids containing molybdenum, such as, phosphomolybdic acid, can also be used.

Illustrative soluble forms of the catalytic materials are the naphthenates, stearates, octoates, carbonyls and the like. Specific and preferred catalytic compounds of this type for use in the invention are the naphthenates and carbonyls of molybdenum, vanadium and tungsten. The catalysts remain dissolved in the reaction mixture throughout the process and can be reused in the reaction after removal of the reaction products therefrom.

As to the substrate, olefinically unsaturated materials which can be epoxidized include substituted and unsubstituted aliphatic and alicyclic olefins which may be hydrocarbons, esters, alcohols, ketones, or ethers or the like and have from 3 to 30 carbon atoms. For preparation of non-ionic detergents the substrate will be desirably a mixture of normal alpha-olefins, said olefins containing about 8 to 24 carbon atoms and preferably 11 to 15 carbon atoms. This mixture may be pure or may also contain other hydrocarbon materials.

In the epoxidation of the olefins, the ratio of olefins to organic peroxy compounds can vary over a wide range. Generally, mol ratios of olefin to hydroperoxide broadly in the range of 0.5:1 to 100:1 and preferably 2:1 to 10:1 are employed.

The concentration of hydroperoxides in the olefin epoxidation reaction mixture at the beginning of the reaction will normally be one percent or more although lesser concentrations will be effective and can be used. To avoid formation of undesirable by-products and yield loss due to unselective oxidation of olefins, the conversion of olefins in the reaction should be less than 90% and preferably less than 50%. Maintaining olefin conversion at a fairly low level insures a highly selective conversion of hydroperoxide to epoxide.

It is desirable to insure the quantitative conversion of hydroperoxide since recovery of unconverted hydroperoxide is often difficult. When operated under the conditions described hereinabove, the conversion of hydroperoxide will be 90% to 99% and the selectivity to epoxide will be 75% to 95%.

The reaction can be carried out in the presence of a solvent, and it is generally desirable that one be used. In general, aqueous solvents are not contemplated. Among the suitable solvents are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

It has been discovered that a mixture of 1,2 epoxides produced from a normal alpha-olefin fraction wherein the olefins consist substantially of 8 to 24 carbon atoms can be converted to derivatives which are excellent starting materials in the preparation of biodegradable detergents. It is preferred to use as starting material, a normal alpha-olefin fraction wherein substantially all of the olefins have from 11 to 15 carbon atoms. It has further been discovered that these derivatives can be prepared from the epoxides in the epoxidation reaction mixture in the presence of unconverted normal alpha-olefins and other hydrocarbons which may have been present in the alpha-olefin feed to the epoxidation reactor. And it has been discovered that these derivatives are easily separated from the aforementioned mixture by distillation techniques or by solvent extraction techniques.

Reaction of the mixtures of 1,2 epoxides which have the formula

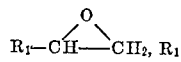

being an alkyl radical of from 6 to 22 carbon atoms, with a hydroxyl compound of the formula R$_2$OH wherein R$_2$ is selected from the group consisting of H and

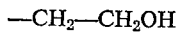

will produce a mixture of products falling within the group represented by the formulas

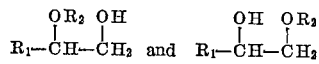

In preferred embodiments of this invention R$_1$ will contain from 9 to 13 carbon atoms.

Of the two hydroxyl compounds, water and ethylene glycol, suitable for use in this invention, water is preferred. It is, of course, cheaper and easier to handle than ethylene glycol but of more importance is the fact that the product of reaction will always be a 1,2 glycol, of the formula

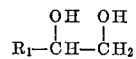

which will ethoxylate preferentially at the 1 position to form a non-ionic detergent. Ethoxylation at the 2 position is possible but requires more severe ethoxylation conditions. The product of the reaction of the epoxides with ethylene glycol will be a mixture of glycol ether compounds of the formulas.

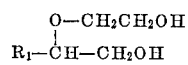

and

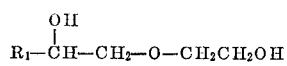

The former class of products may ethoxylate at either primary hydroxyl group whereas the latter class of products will tend to ethoxylate at the single primary hydroxyl group.

These glycols or glycol ethers produced as described above have vapor pressures substantially lower than that of the unconverted alpha olefins, or other hydrocarbons normally present in the reaction mixture. For instance the maximum boiling point of a C$_{11}$–C$_{15}$ alpha olefin fraction is 170° C. at 40 mm. Hg whereas the lowest boiling glycol formed by the method of this invention boils at about 190° C. at 40 mm. Hg and the lowest boiling glycol ether over 200° C. at 40 mm. Separation is thus easily accomplished by distillation techniques. Unconverted olefins are removed from the mixture in an overhead fraction leaving glycols or glycol ethers as a bottoms product.

The mixture of 1,2 glycols or glycol ethers is then ethoxylated with from about 3 to 25 mols of ethylene oxide but preferably 3 to 15 mols per mol of glycol or glycol ether to form either a non-ionic detergent or an ethylene oxide adduct which may be sulfated according to known methods to produce an anionic detergent.

The reaction of water or glycol with the 1,2 epoxides can take place in the presence of all the products of the epoxidation reaction including unreacted normal alpha olefins, unconverted hydroperoxide, alcohols and ketones (the reduction products of the hydroperoxide), and hydrocarbons which are introduced with the olefin fraction, carried over from the hydroperoxide formation step or added as a solvent in the epoxidation reaction. It is preferred however to concentrate the 1,2 epoxides by removal of easily distilled hydrocarbons prior to further reaction.

The reaction with water or glycol is carried out at temperatures generally between 20° C. and 200° C., preferably 80–150° C. The pressure should be sufficient to maintain the liquid phase and is illustratively 1 to 100 atmospheres. The mol ratio of water or glycol to epoxides can be about 1:1 to 50:1 but is preferably 2:1 to 20:1.

The reaction is catalyzed by either acid or base. Various oxides of the alkali metals, bases such as NaOH, KOH, Ba(OH)$_2$, Ca(OH$_2$), Na$_3$CO$_3$, K$_2$CO$_3$, BaCO$_3$, CaCO$_3$, hydroxides of the alkali metals, and the like are particularly suitable. Acidic materials such as, for example, H$_2$SO$_4$, HCl, H$_3$PO$_4$, H$_2$SO$_3$, HCN, H$_3$BO$_3$, H$_2$B$_4$O$_7$ and numerous others are also satisfactory. The amount of catalyst used can be from about 0.001% to about 5.0 weight percent of the water or glycol added. Preferably the amount of catalyst used will be from about 0.10% to about 1.0% of the water or glycol added.

The 1,2 glycols or glycol ethers as the case may be are separated from the reaction mixture by distillation. Unconverted olefins and other hydrocarbons hereinbefore described are taken as overhead distillate leaving as bottoms the desired product mixture of glycols or glycol ethers.

Ethoxylation of the glycols or glycol ethers may be carried out by methods known to the art with from about 3 to about 25 mols of ethylene oxide per mol of product, and preferably from about 3 to about 15 mols. Ethoxylation is carried out in the liquid phase at temperatures between 150° C. and 250° C. Typically the desired amount of ethylene oxide is added to the glycol or glycol ether mixture and reacted in an autoclave for about 5 to about 20 hours.

The following examples set forth preferred embodiments of the invention but are not to be construed as limiting its scope. Unless otherwise specified, parts and percentages are by weight.

Example I

This exemplifies the epoxidation of a normal alpha-olefin fraction.

A mixture of normal alpha olefins wherein the olefins contain 11 to 15 carbon atoms was epoxidized as follows.

A mixture of 2.5 grams of molybdenum naphthenate (containing 5% molybdenum) and 414 grams of olefin mixture (about 2 mols) was placed in a vessel wherein the temperature was controlled at 90° C. To this mixture was added in a continuous fashion over an eight hour period 575 grams of a 24 weight percent solution of ethylbenzene hydroperoxide in ethylbenzene (1.0 mols of hydroperoxide). Thirty minutes after addition of hydroperoxide was complete the reaction mixture was cooled to about 25° C. Analysis of the reaction mixture indicated that 99.0% of the hydroperoxide had reacted. The mixture was then distilled under reduced pressure (50 mm. Hg) to remove ethylbenzene, some water, alpha-phenyl ethanol, acetophenone and the C-11 and C-12 olefins as an overhead fraction. Analysis of the bottoms and overhead showed that the selectivity of the hydroperoxide conversion was 85% to a mixture of $C_{11}$ to $C_{15}$ 1,2-oxides. It further showed that the olefin conversion was 45.7% and that the selectivity of the olefin conversion to the 1:2 oxides was 95%.

Example II

Cumene hydroperoxide was used in place of ethylbenzene hydroperoxide in an epoxidation carried out substantially as in Example I. The results were similar to those achieved in Example I.

Example III

This exemplifies the reaction of a mixture of $C_{11}$ to $C_{15}$ 1,2-oxides and normal alpha olefins with water to form 1,2-glycols.

The botoms from the above distillation of Example I were contacted with vigorous agitation at 90° C. with 200 ml. of water containing 0.5% NaOH for 2 hours. Water and unreacted olefin, were removed overhead by distillation, leaving bottoms consisting essentially of mixed 1,2 glycols. The distillation was carried out at 100 mm. Hg and the overhead fraction was collected in the temperature range 50° C. to 194° C. The conversion of 1,2-epoxides was 100% and the selectivity to 1,2-glycols was 94%.

Example IV

This exemplifies the reaction of the epoxidation reaction mixture with ethylene glycol to form glycol ethers.

The epoxidation reaction product mixture produced as in Example I was concentrated by distillation to remove ethylbenzene, 300 grams of ethylene glycol containing 0.5% NaOH was added to the concentrated product mixture and the mixture was maintained at 125° C. for 2 hours. Glycol, unreacted olefin, alpha-phenylethanol and some acetophenone were removed overhead by distillation leaving bottoms consisting essentially of mixed glycol ethers. The distillation was carried out at 200 mm. Hg and the overhead fraction was collected in the temperature range 85° C. to 150° C. The conversion of epoxides was 100% and the selectivity to glycol ethers was 97%. Glycol conversion was 17% and selectivity to glycol ethers 99%.

Example V

This exemplifies the ethoxylation of the product of Example III to form a non-ionic detergent.

The crude glycols from Example III which still contained the catalyst were charged to an autoclave with 420 grams of ethylene oxide (mol ratio oxide to glycol 12/1). The mixture was heated for 4 hours at 150° C. and for an additional 6 hours at 180° C. Ethylene oxide conversion was 100% and the resultant product was a useful nonionic detergent consisting of amixture of glycol ethers of the formula $R_1$—CHOH—$CH_2$—O—$(CH_2CH_2$—O$)_n$H wherein $n$ is largely between 10 and 14 and $R_1$ is an alkyl radical containing 9 to 13 carbons.

Example VI

This exemplifies the ethoxylation of the product of Example IV to form a non-ionic detergent.

The crude glycol ethers from Example IV were ethoxylated with 500 grams of ethylene oxide as in Example V (mol ratio of oxide to glycol ether 13.8/1) to form a useful nonionic detergent consisting of a mixture of glycol ethers of the formulae $$R_1-CH\begin{matrix}O-CH_2CH_2-O(CH_2-CH_2-O)_nH \\ \\ CH_2OH\end{matrix}$$

and $$R_1-CHOH-CH_2-O-CH_2-CH_2-O-(CH_2-CH_2-O)_nH$$

wherein $n$ is largely between 12 and 16 and $R_1$ is an alkyl radical containing 9 to 13 carbon atoms.

Example VII

Vanadium naphthenate was substituted for molybdenum naphthenate in the procedure described in Example I. The results were similar to those achieved in Example I.

Example VIII

Example I was carried out using tungsten carbonyl in place of molybdenum naphthenate and substantially similar results were achieved.

Example IX

Example I was carried out using tetra-butyl titanate in place of molybdenum naphthenate and substantially similar results were obtained.

Example X

Example I was carried out using tantalum naphthenate in place of molybdenum naphthenate and substantially similar results were obtained.

Example XI

Example I was carried out using niobium naphthenate in place of molybdenum naphthenate and substantially similar results were obtained.

Example XII

Example I was carried out using rhenium heptoxide in place of molybdenum naphthenate and substantially similar results were obtained.

Example XIII

Example I was carried out using selenium naphthenate in place of molybdenum naphthenate and substantially similar results were obtained.

What is claimed is:

1. A process which comprises contacting at temperatures of from about 20° C. to about 200° C. a mixture of alpha olefins each having from 3 to 30 carbon atoms, with an alkyl, cycloalkyl or ar-alkyl hydroperoxide, having from 3 to 20 carbon atoms, in the presence of an epoxidation catalyst selected from the group consisting of napthenates, sterates, octoates and carbonyls of Ti, V, Cr, Cb, Se, Zr, Mo, Te, Ta, W, Re and U and oxides, chlorides, fluorides and sulfides of molybdenum, and reacting the resulting 1,2-epoxide with water or ethylene glycol, and distilling the unreacted alpha olefin from the resulting product.

2. A process according to claim 1 wherein the olefins have from 8 to 24 carbon atoms.

3. A process according to claim 1 wherein the temperature of the epoxidation reaction is from about 80° C. to about 150° C.

4. A process according to claim 1 wherein the olefins have from 11 to 15 carbon atoms and the temperature of the epoxidation reaction is from about 80° C. to about 150° C.

References Cited

UNITED STATES PATENTS

| | | |
|---|---|---|
| 2,786,854 | 3/1957 | Smith. |
| 2,833,787 | 5/1958 | Carlson et al. |
| 3,030,426 | 4/1962 | Moseley et al. |
| 3,062,841 | 11/1962 | Yang et al. |
| 3,119,848 | 1/1964 | Wrigley et al. ____ 260—615 XR |
| 3,350,422 | 10/1967 | Kollar. |
| 3,351,635 | 11/1967 | Kollar. |

FOREIGN PATENTS

| | | |
|---|---|---|
| 736,991 | 9/1955 | Great Britain. |

OTHER REFERENCES

Hawkins, Jour. Chem. Soc. (1950), pp. 2169–2173.

LEON ZITVER, Primary Examiner

H. T. MARS, Assistant Examiner

U.S. Cl. X.R.

260—348.5, 484, 594, 611, 635